June 15, 1926.

A. ROBERTS 1,588,469

DESIGN AND OPERATION OF COKE OVEN

Original Filed Oct. 20, 1921　　12 Sheets-Sheet 2

Inventor.
Arthur Roberts

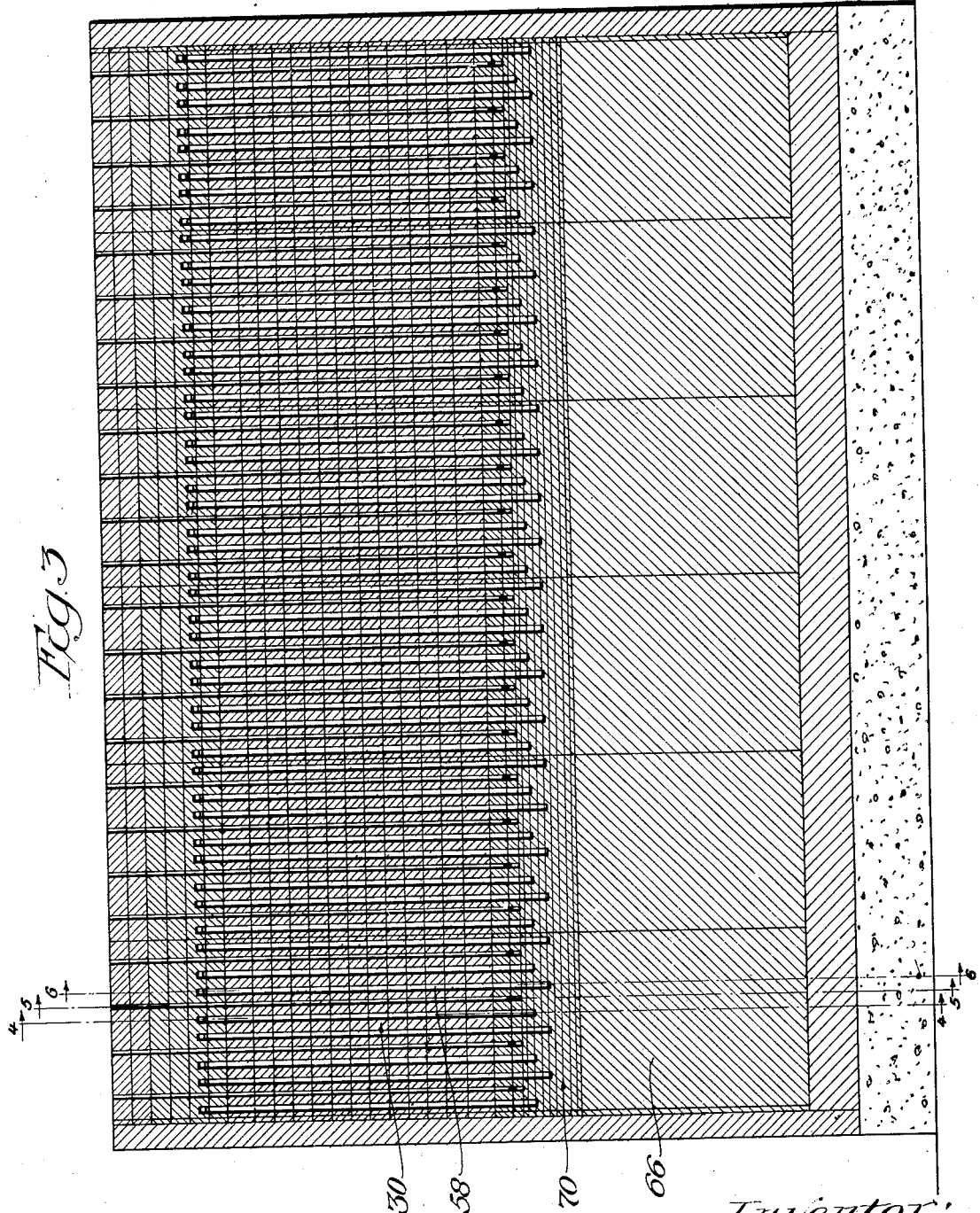

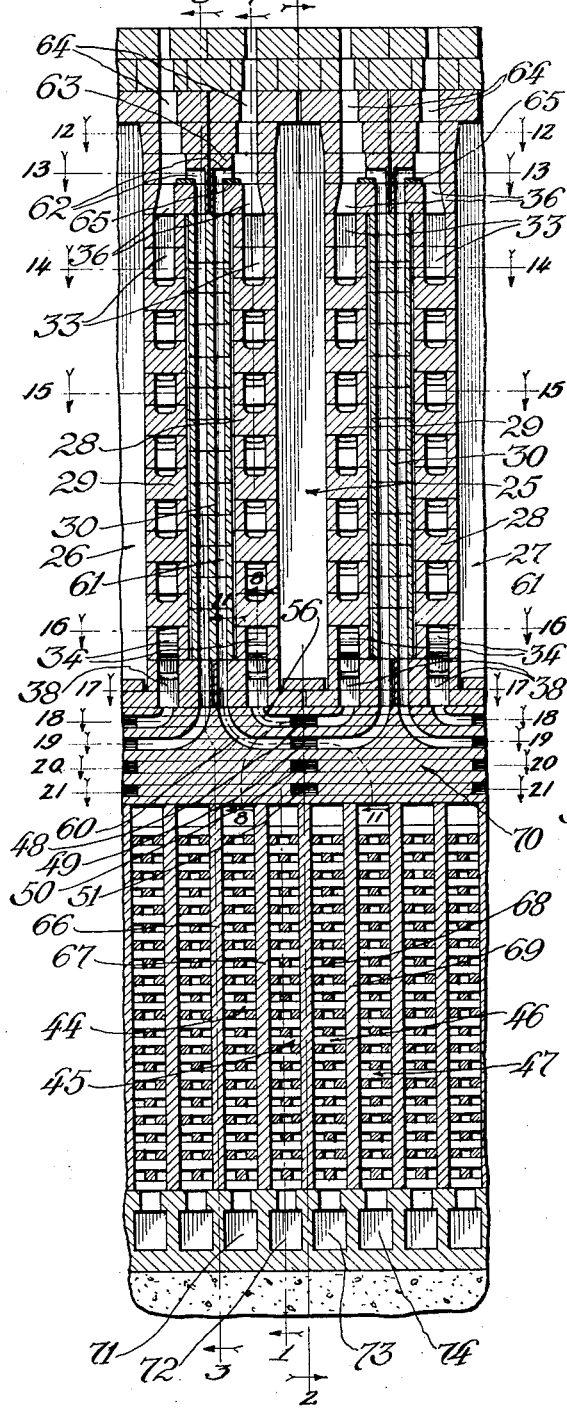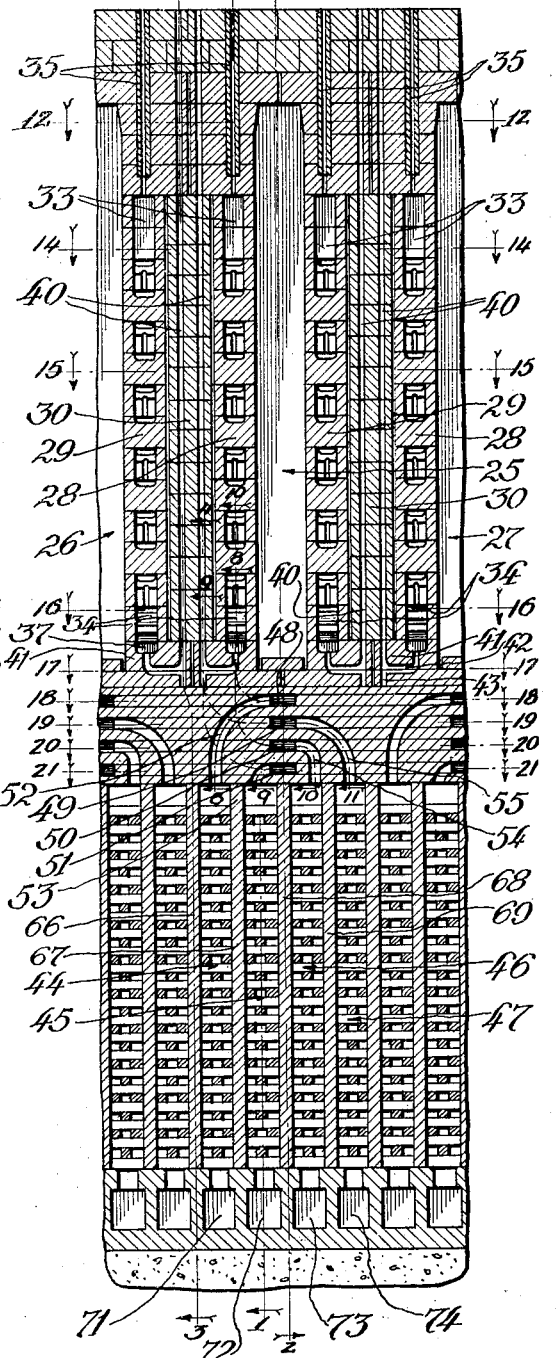

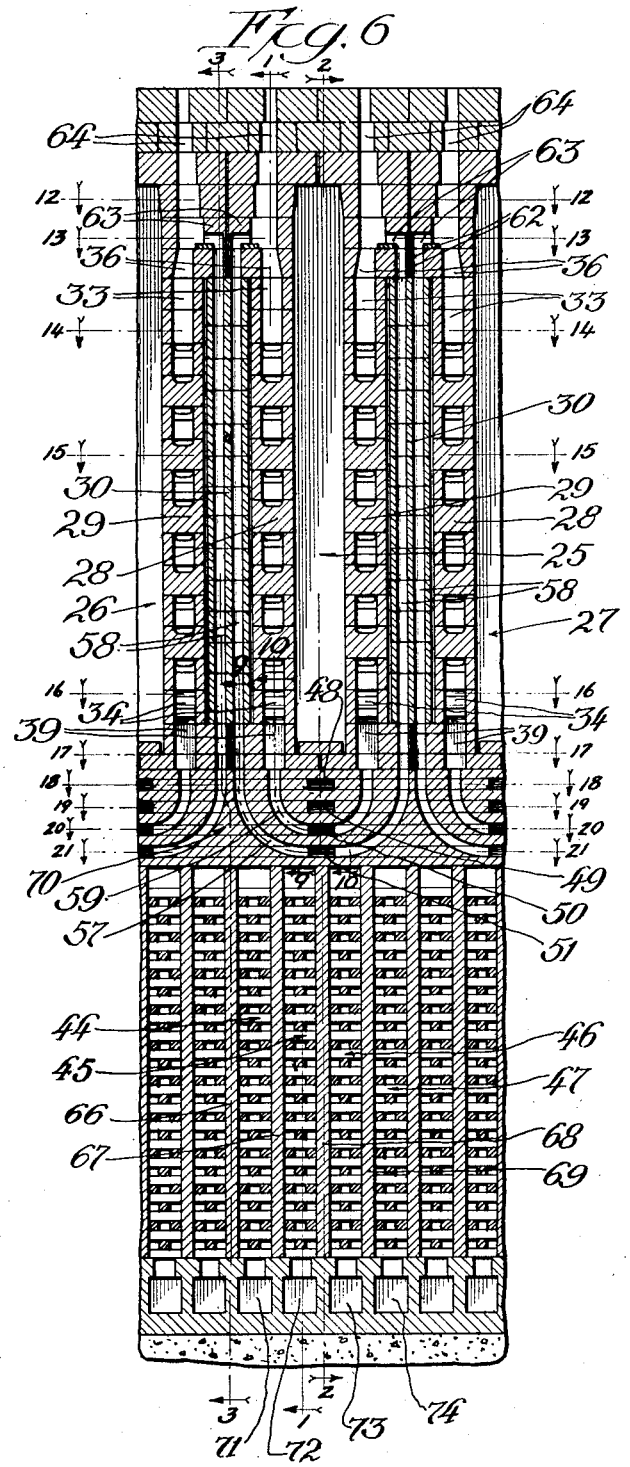

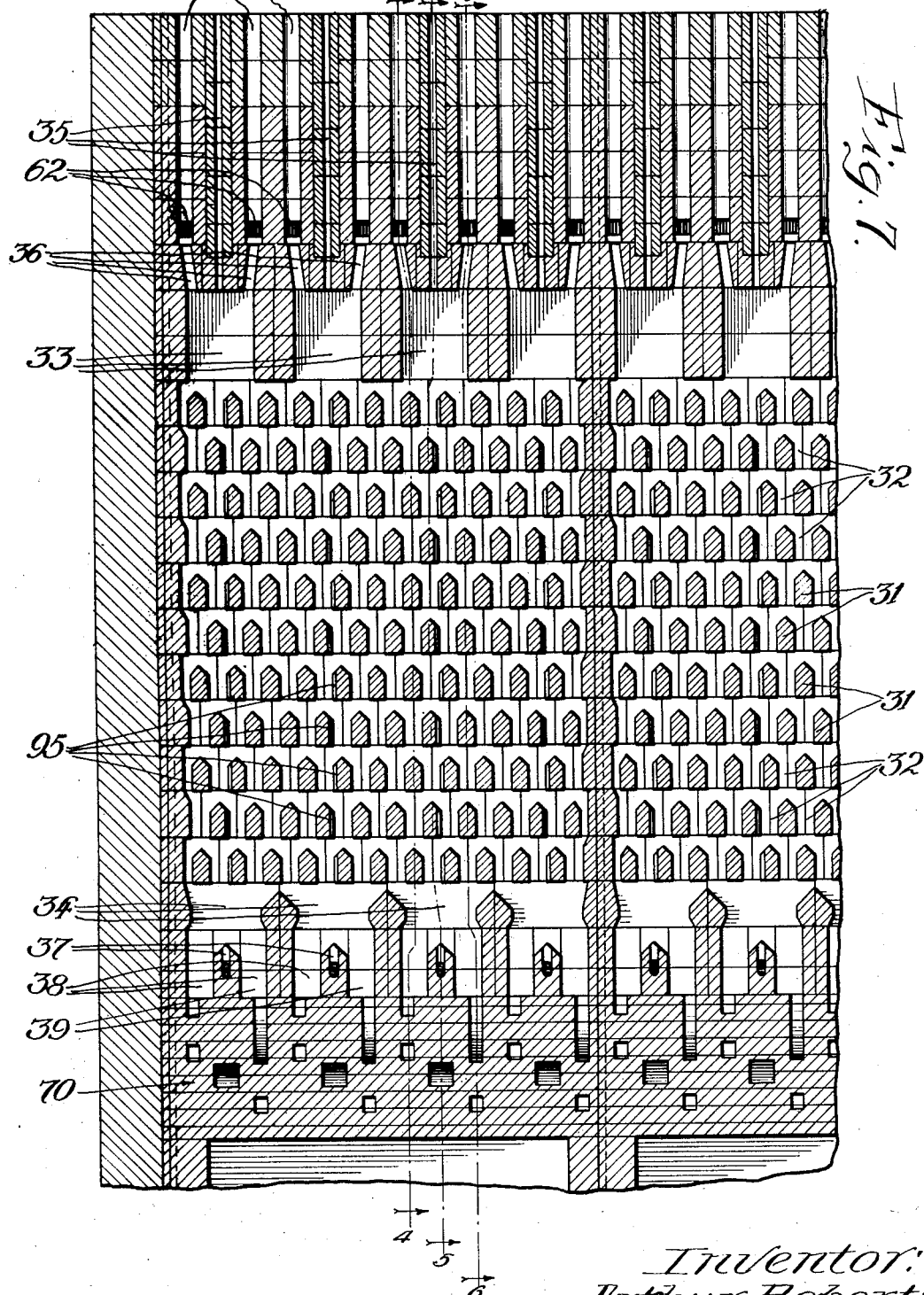

June 15, 1926.

A. ROBERTS 1,588,469

DESIGN AND OPERATION OF COKE OVEN

Original Filed Oct. 20, 1921   12 Sheets-Sheet 7

Inventor:
Arthur Roberts

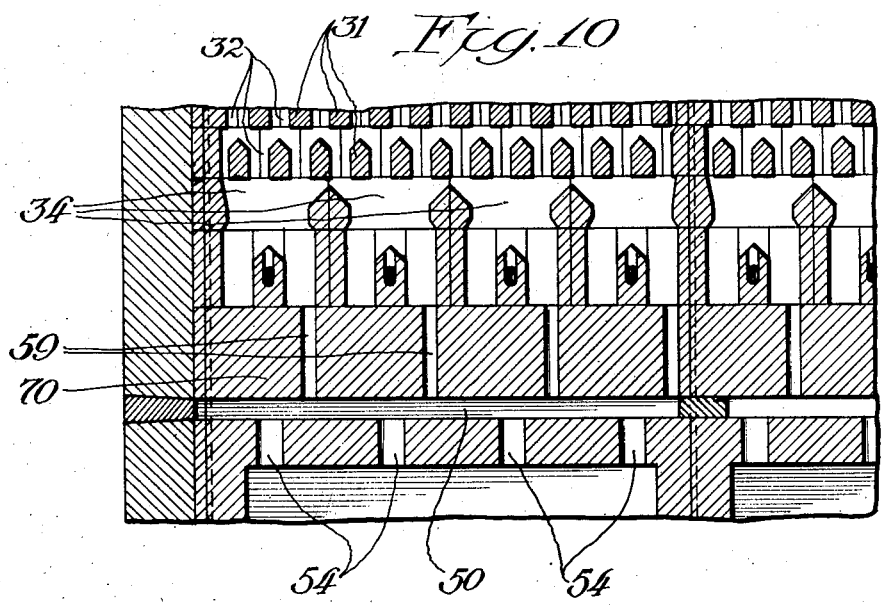
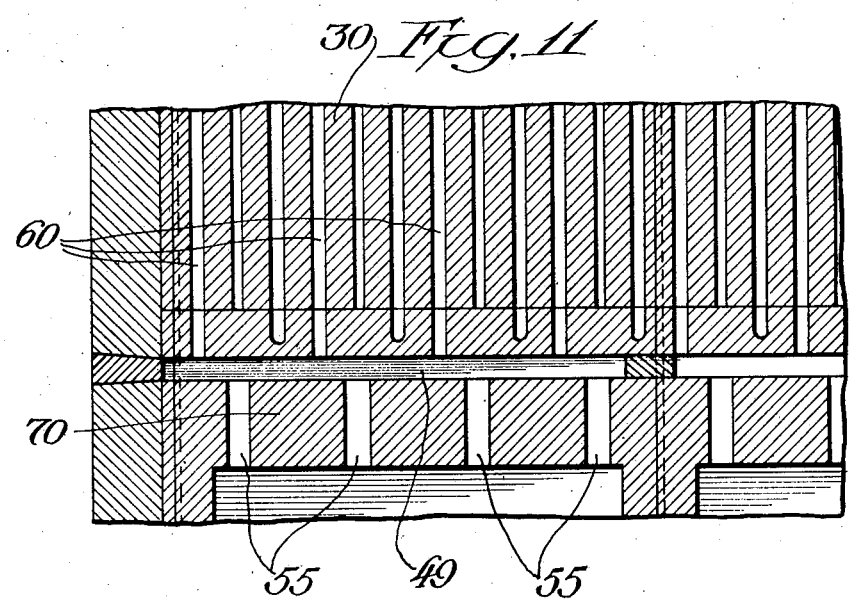

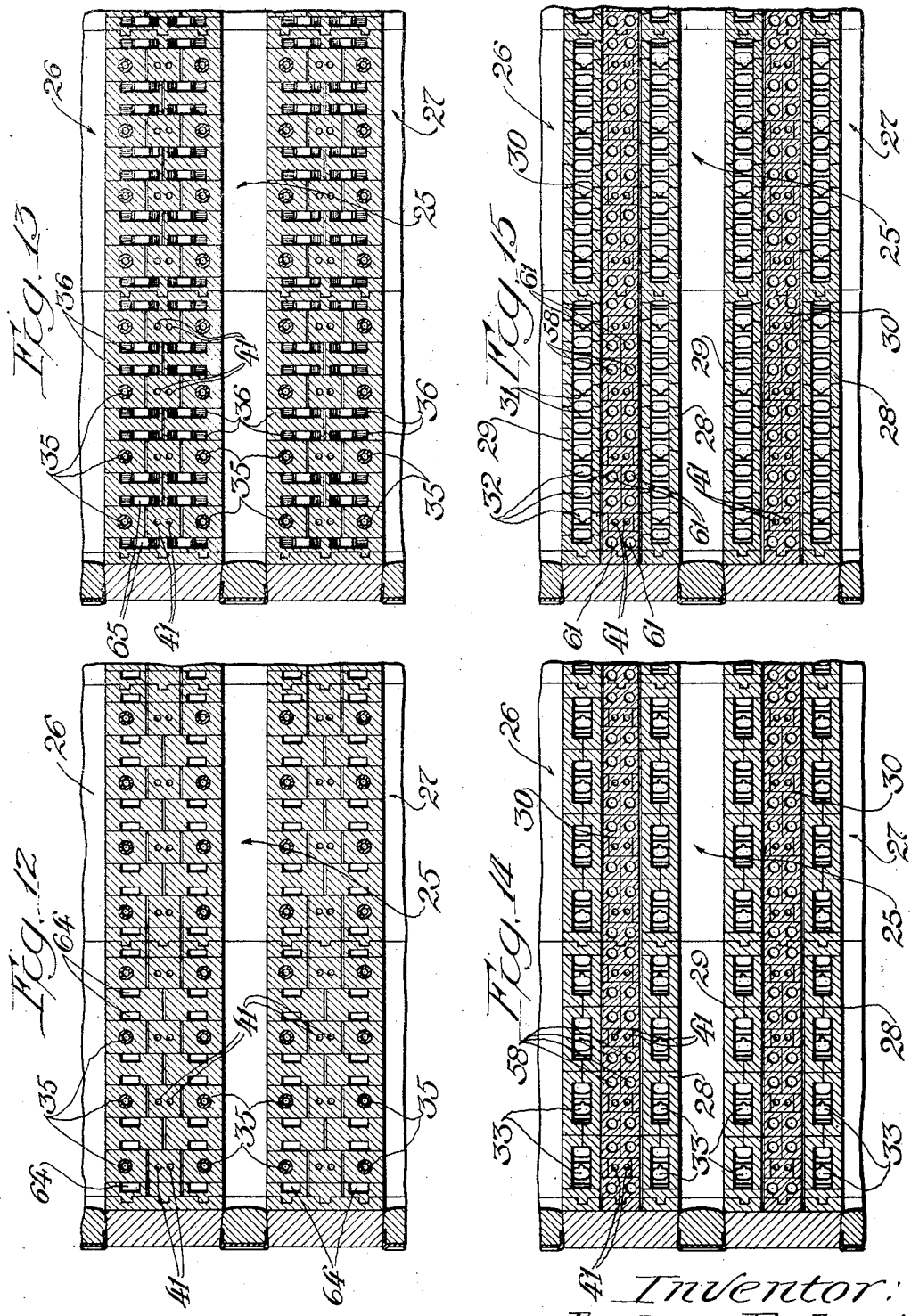

June 15, 1926.  1,588,469
A. ROBERTS
DESIGN AND OPERATION OF COKE OVEN
Original Filed Oct. 20, 1921  12 Sheets-Sheet 11
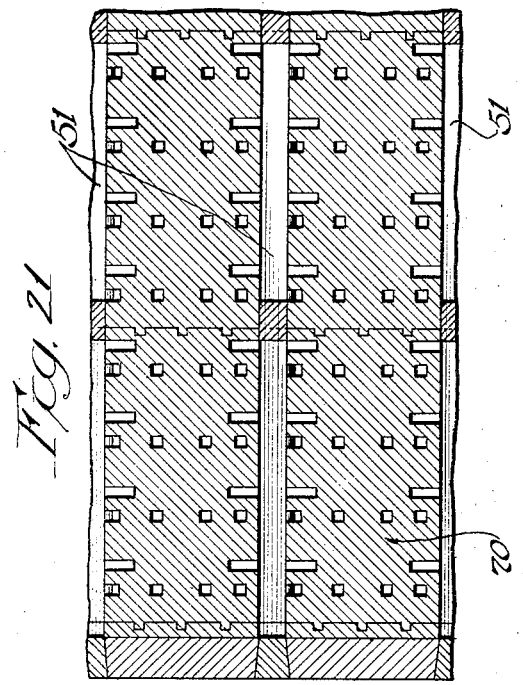
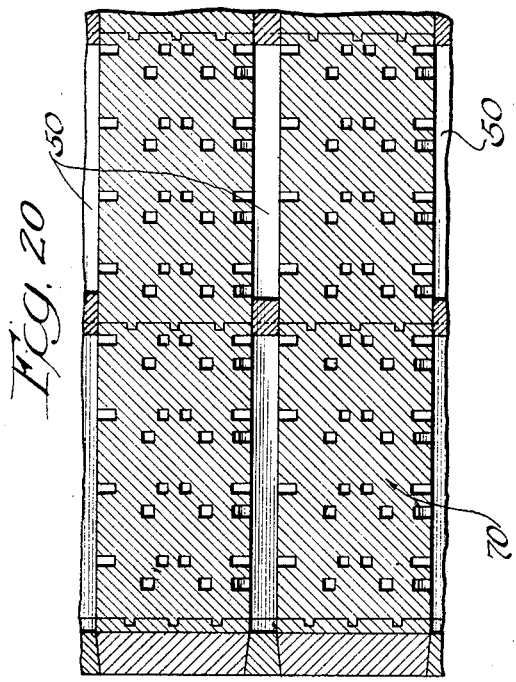
Inventor:
Arthur Roberts Patented June 15, 1926.

1,588,469

UNITED STATES PATENT OFFICE.

ARTHUR ROBERTS, OF EVANSTON, ILLINOIS, ASSIGNOR, BY MESNE ASSIGNMENTS, TO CHICAGO TRUST COMPANY, TRUSTEE, OF CHICAGO, ILLINOIS, A CORPORATION.

DESIGN AND OPERATION OF COKE OVEN.

Application filed October 20, 1921, Serial No. 508,914. Renewed February 5, 1926.

This invention has to do with certain improvements in coke oven design and operation. The invention has reference particularly to certain improvements in the design and operation of regenerative coke ovens. Considered from another standpoint the invention has to do with improvements in coke ovens which may be heated by the use of relatively lean gas; and in this connection one of the objects is to provide a coke oven structure which may be satisfactorily heated and operated on either coke oven gas or relatively lean gas as desired.

Still more particularly the invention relates to improvements in regenerative coke ovens which may be satisfactorily heated and operated on either coke oven gas, producer gas, blast furnace gas, or water gas; and in this connection one of the objects of the invention is to provide an oven structure which, when operated on relatively lean gas, may operate with regeneration of both the air and the gas, and which, when operated on coke oven gas, may be operated with regeneration only of the air.

When operating a coke oven on relatively lean gas, such as producer gas, it is desirable to be able to use a relatively high degree of preheating of such gas. This is true because the producer gas itself possesses only a relatively low calorific value, and also because it is necessary to use a relatively large volume of such gas in order to secure the necessary total amount of heat effect. Producer gas may be preheated to a high degree without cracking and deposition of carbon, which fact is in line with desirability of using a high degree of preheat of such gas in order to secure the best coke oven operations.

One of the objects of the present invention is to so arrange the heating walls and other passages, and to so relate the same to the regenerators, that when operating on coke oven gas a maximum degree of preheating of the air may be secured combined with a direct use of the coke oven gas, and such that when operating on producer gas a maximum degree of preheat of the producer gas, as well as the air, may be secured.

A further object in this connection is to so arrange the heating walls and the regenerators that the foregoing results may be secured in combination with the ability to reverse the regenerator operation in a very simple manner, thereby reducing the period during which the inert gases only are in contact with the oven walls, very materially.

Another feature of this invention relates to the operation of the gases within the heating walls themselves. In this connection one object of the invention is to provide an arrangement in which the flow of heating gases in each wall may be alternately up and down as the reversals of regeneration are performed.

More particularly one of the objects of the present invention is to provide a coke oven structure embodying all of the foregoing features and which structure is built up from notched blocks of suitable form, for example, of the general type shown in various Letters Patent of the United States and applications filed by me including, for example, Letters Patent No. 1,132,685. I wish to state in this connection that while I have hereinto shown and described the features of the present invention as incorporated within an oven embodying the notched block type of construction, still I do not limit myself to the use of said features in this or any other type of construction, except as I may do so in the claims.

Another object is to provide a practical operative coke oven intended for operation on either the relatively rich coke oven gas or relatively lean producer gas or blast furnace gas or water gas, and which oven structure is built up in whole or in part on the notched block principle; as distinguished from a merely theoretical impractical arrangement not capable of actual successful practical construction and operation.

Bearing the foregoing facts in mind reference may be had to the accompanying drawings in which:—

Fig. 1 is also a section taken on line 1—1 of Figs. 4, 5 and 6 looking in the direction of the arrows;

Fig. 3 shows a longitudinal section through one of the partition walls between the two heating walls, and is also a section taken on the lines 3—3 of Figs. 4, 5, and 6 looking in the direction of the arrows;

Fig. 4 is a vertical cross section taken on the lines 4—4 of Figs. 1, 3 and 7 looking in the direction of the arrows;

Fig. 5 is a vertical cross section taken on the lines 5—5 of Figs. 1, 3 and 7 looking in the direction of the arrows;

Fig. 6 is a vertical cross section taken on the lines 6—6 of Figs. 1, 3 and 7 looking in the direction of the arrows;

Fig. 7 is an enlarged fragmentary view of the end portion of a heating wall, being an enlarged view of the upper end portion of Fig. 1;

Fig. 10 is a longitudinal fragmentary phantom section taken on the lines 10—10 of Figs. 5 and 6 looking in the direction of the arrows;

Fig. 11 is a longitudinal fragmentary phantom section taken on the lines 11—11 of Figs. 4 and 5 looking in the direction of the arrows;

Figure 22:
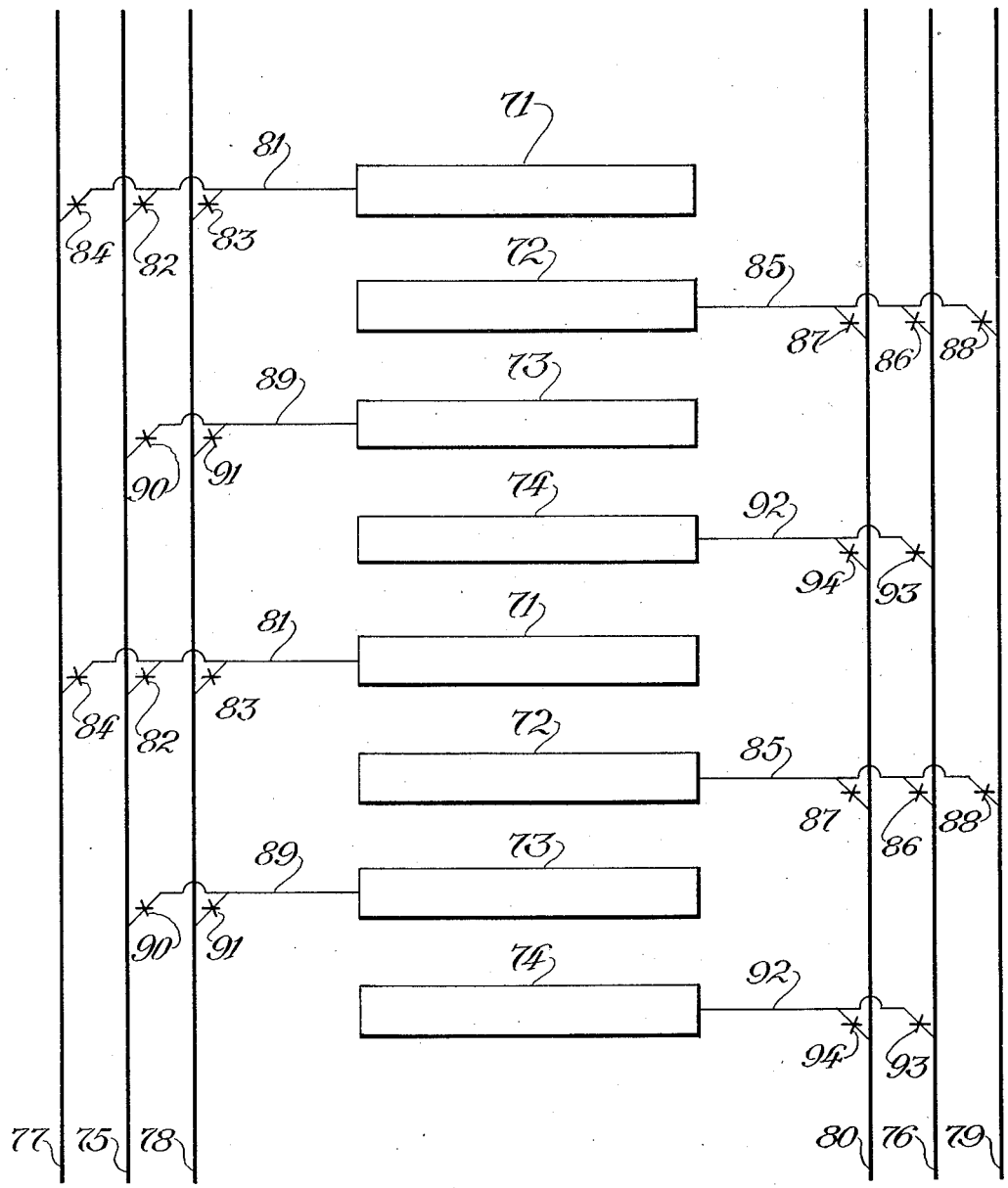

Figs. 12, 13, 14, 15, 16, 17, 18, 19, 20 and 21 are fragmentary horizontal sections taken on the lines 12—12, 13—13, 14—14, 15—15, 16—16, 17—17, 18—18, 19—19, 20—20 and 21—21 of Figs. 4, 5, and 6 looking in the direction of the arrows; and Fig. 22 shows diagrammatically a series of connections and valves for properly controlling the flow of gas and air.

Referring first to Figs. 4, 5 and 6, I have therein illustrated the walls and regenerator chambers for one complete oven numbered 25, and for parts of the adjacent retorts numbered 26 and 27 respectively. I have also illustrated the features of the invention as embodying an oven structure within which there are provided the individual heating walls 28 and 29 for each retort. I have also shown said features as being embodied within an oven structure in which the adjacent walls of consecutive retorts are individualized, and in which there are provided partition walls 30 between the heating walls of the adjoining retorts. This arrangement is illustrated because it is a very satisfactory arrangement and in some cases will be found to be of special advantage; but I do not intend to limit the features of the present invention as used within this particular type of structure except as I may do so in the claims.

I will also state that each of the heating walls is shown as being built up from notched blocks 31 set into horizontal courses and in such a manner that their notches serve to provide zig-zag generally vertically extending heating gas passages 32. Neither do I intend to limit the present invention to coke ovens built up from notched blocks except as I may do so in the claims.

In the upper portion of each heating wall there is a series of combustion chambers 33, and in the lower portion of each heating wall there is another series of combustion chambers 34. On one portion of the operating cycle the combustion constituents are introduced into the chambers 33 and the heating gases flow downwardly through the chambers 34 to the point of delivery; whereas on the other half of the cycle the combustion constituents are delivered into the chambers 34 and the heating gases flow upwardly and are delivered through the chambers 33.

In those cases in which it may be desired to use the oven on gas which has not been preheated, as for example coke oven gas, I provide a series of gas nozzles 35 which reach down into communication with the combustion chambers 33, the unpreheated gas, for example coke oven gas, being introduced through these nozzles on one half of the cycle.

In communication with the combustion chambers 33 are also the ports 36 through which may be introduced combustion constituents, either air or preheated gas such as producer gas. As a matter of convenience, I have shown two of the ports 36 leading into each combustion chamber 33 and when this arrangement is used these ports 36 may be located one at each side of each of the gas nozzles 35. However, when air is introduced through the ports 36 to burn gas introduced through the nozzles 35, such gas will flow into air envelopes and the combustion and heating process will thus be improved.

Leading upwardly into each of the lower combustion chambers 34 is a gas nozzle 37, preferably in the form of a slitted burner block. In communication with each of the combustion chambers 34 is also a pair of ports 38 and 39. The burner nozzles 37 may be used for the introduction of unpreheated gas on the reverse half of the cycle, and at such time either one or more of the ports 38 and 39 may be used for the introduction of preheated air into the combustion chambers 34. These ports 38 and 39 may also be used for the introduction of preheated gas such as producer gas, and air when operating on preheated gas.

Suitable connections are provided for supplying gas to the nozzles 35 and to the nozzles 37 when unpreheated gas is used. As a matter of convenience all of these connections are located adjacent to the top of the oven structure in the construction illustrated herein, but as far as certain features of the present invention are concerned these connections might be established in other places. Where the connections are to be established in the upper portion of the structure the top nozzles 35 may be reached directly, but it is then necessary to provide downwardly extending passages 40 for delivering gas to the lower nozzles 37. These passages 40 may be conveniently located within the partition walls 30 when such partition walls are used, or in any other suitable structure. Furthermore, at such times the connections from the passages 37 may be effected by means of nozzle blocks 41 having the U-shaped passages 42, said nozzle blocks 41 underlying the partition wall and the U-shaped passages 42 establishing the connections with the passages 40 on a horizontal plane of shear. This feature is also disclosed in my co-pending application for Letters Patent of the United States on improvements in coke ovens and the like, Serial No. 322,413, filed September 8, 1919, and therefore I do not claim the same per se in this application. It will be noted that beneath the lower end of each of the passages 40 is a recess 43 at a lower elevation than the U-shaped passages 42. These pockets when provided will serve to catch any dirt or foreign matter which may fall down through the passages 40 without obstruction to the U-shaped passages 42.

The ports 36 serve for the introduction of top preheated air when gas is supplied through the nozzles 35. One of these ports 36 serves for the introduction of top preheated air and the other serves for the introduction of top preheated gas when preheated gas is to be used. Both of the ports 36 serve for the top removal of spent gas when the wall is operating on the up flow. The ports 38 and 39 serve for the introduction of bottom preheated air when gas is introduced through the nozzles 37. One of these ports serves for the introduction of bottom preheated air and the other serves for the introduction of bottom preheated gas when the oven is operating on preheated gas. Both of the ports 38 and 39 serve for the removal of spent gas when the wall is operating on the down flow.

I have, therefore, provided suitable connections between the ports 36 and the ports 38 and 39 and suitable regenerators which I will now explain in detail.

Corresponding to the heating walls of each oven there is provided four regenerator chambers or groups of such chambers. These are shown in the present case as being located beneath the ovens and in the sub-structure. This is a very satisfactory and desirable location for the regenerators owing, among other things, to the directness of the connections which may be established, and also owing to the convenience of such location, and I have shown such an arrangement in the drawings of this application. I do not limit myself to such arrangement except as I may do so in the claims.

Figure 1:
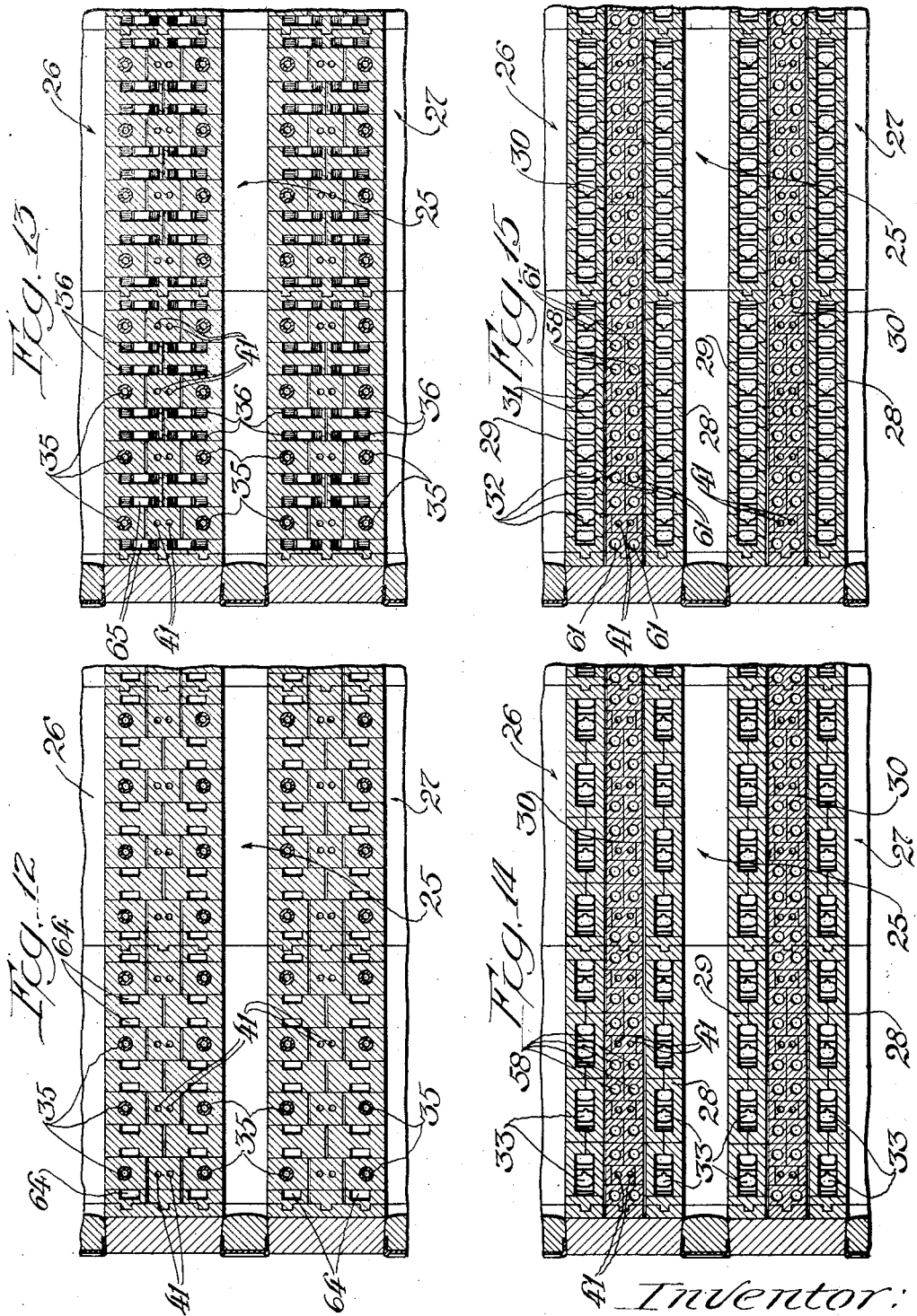
Figure 1 is a longitudinal vertical section through a heating wall of an oven structure embodying the features of the present invention.
Figure 2:
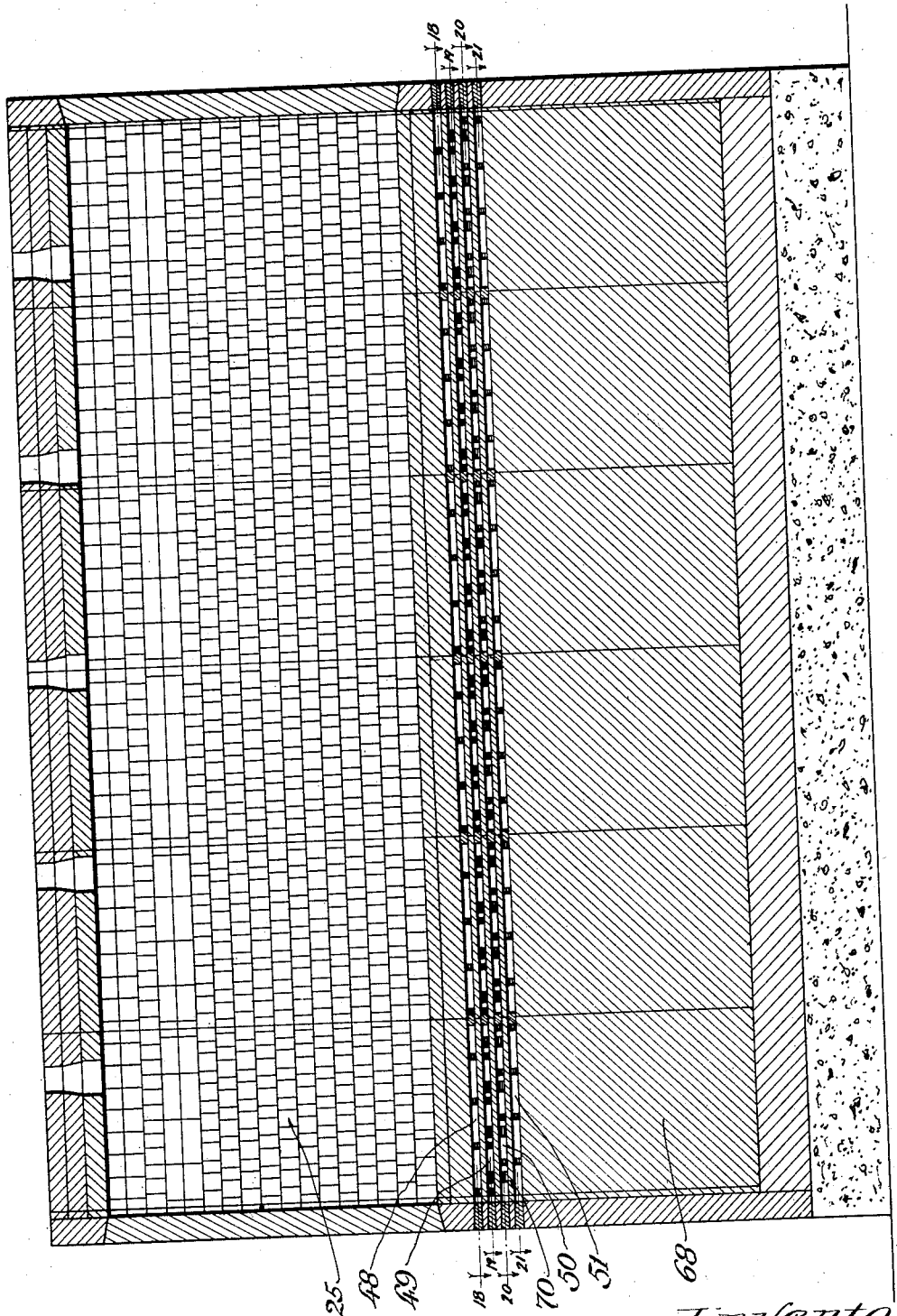
Fig. 2 shows a vertical longitudinal section through the oven chamber, and is also a section taken on the lines 2—2 of Figs. 4, 5, and 6 looking in the direction of the arrows.
Figure 8:
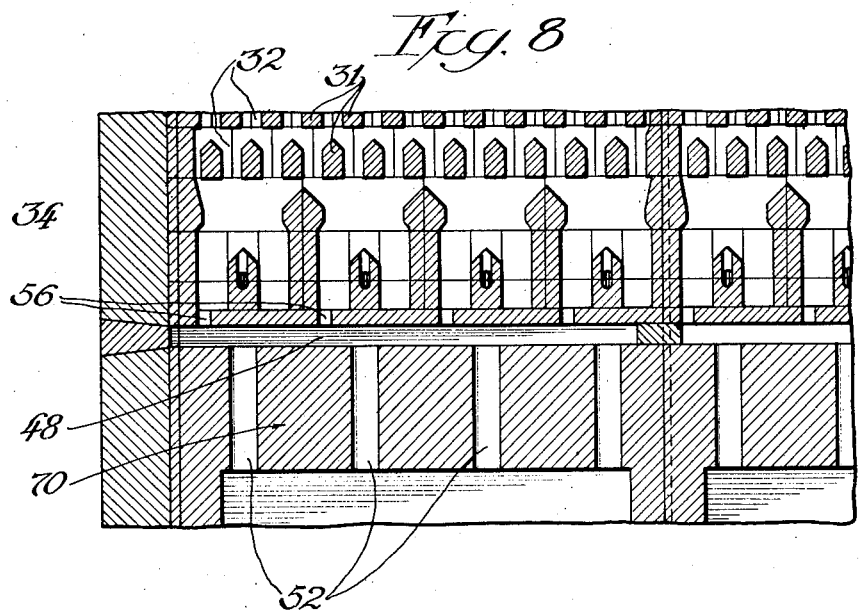
Fig. 8 is a fragmentary longitudinal phantom section taken on the lines 8—8 of Figs. 4 and 5, looking in the direction of the arrows.
Figure 9:
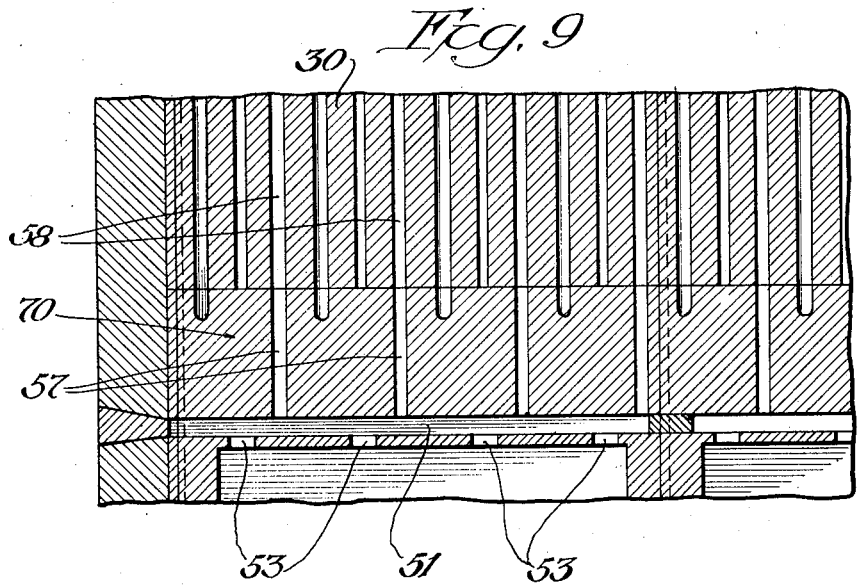
Fig. 9 is a longitudinal fragmentary phantom section taken on the lines 9—9 of Figs. 5 and 6 looking in the direction of the arrows.
Figure 17:
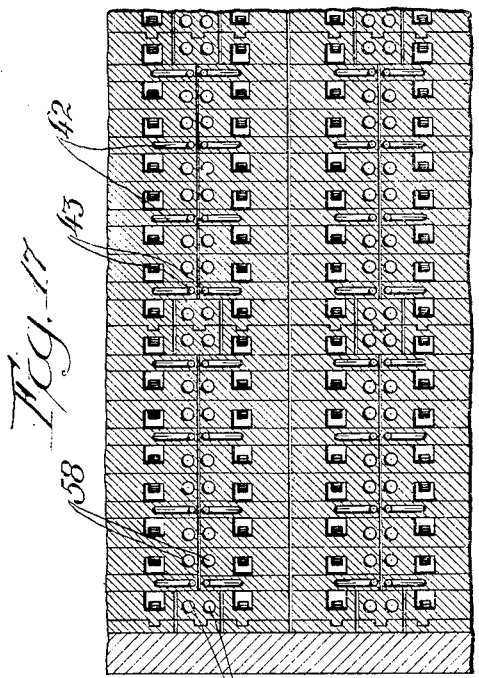
Figure 19:
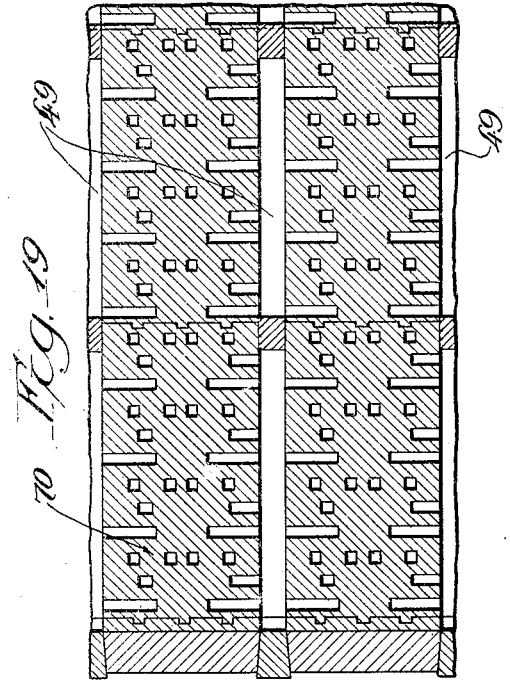
Figure 16:
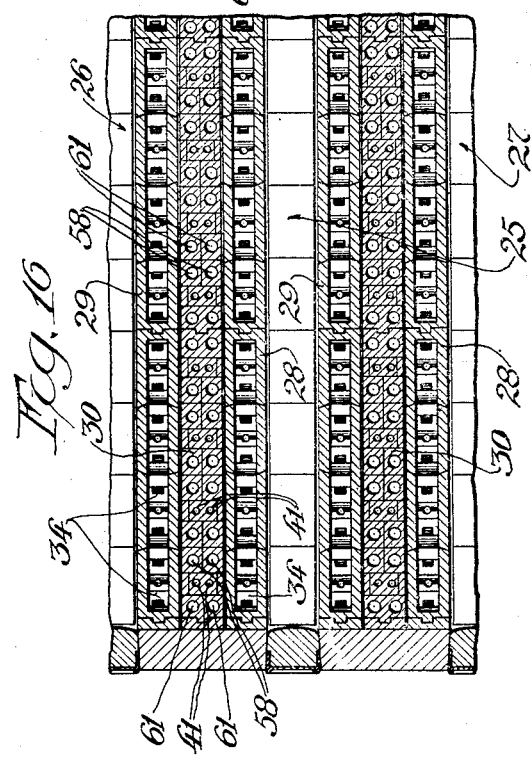
Figure 18:
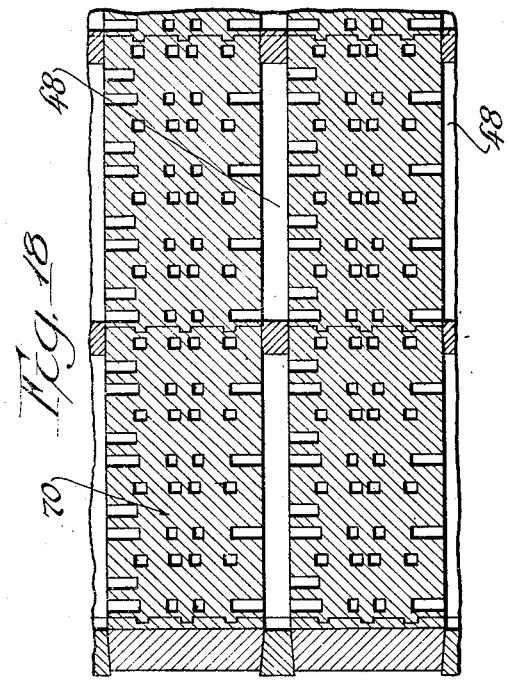

I have, therefore, provided beneath each oven and its heating walls the groups of regenerator chambers 44, 45, 46 and 47. The regenerators of group 44 communicate with the lower ports 38; the regenerators of group 45 communicate with the right hand upper ports 36 of Figs. 1 and 7; the regenerators of group 46 communicate with the lower ports 39; and the regenerators of group 47 communicate with the left hand upper ports 36 of Figs. 1 and 7. The connections whereby these communications are established, include horizontally extending sole passages 48, 49, 50 and 51 which are best illustrated in Figs. 2, 4, 5 and 6. These passages are also shown in Figs. 8, 9, 10, 11, 18, 19, 20 and 21. The regenerators of group 44 communicate with the upper sole passage 48 by a series of risers 52; the regenerators of group 45 communicate with the bottom sole passage 51 by a series of risers 53; the regenerators of group 46 communicate with the lower intermediate sole passage 50 by a series of risers 54; and the regenerators of group 47 communicate with the upper intermediate sole passage 49 by a series of risers 55. These various risers are so interspersed at different points that the proper connections are established without cross interference.

The upper sole passage 48 communicates with the lower ports 38 by a series of risers 56; the lower sole passage 51 communicates with the upper right hand ports 36 by a series of risers 57 in conjunction with passages 58; the lower intermediate sole passage 50 communicates with the lower ports 39 by a series of risers 59; and the upper intermediate sole passage 49 communicates with the upper left hand ports 36 by a series of risers 60 in conjunction with vertical passages 61.

As a matter of convenience the passages 58 and 61 are located within the partition walls but manifestly any other suitable construction might be substituted. The various risers 56, 57, 59 and 60 are interrelated with respect to each other and with respect to the risers 52, 53, 54 and 55 in such a manner as to prevent direct intercommunication between them.

The various vertical passages 58 and 61 communicate with their respective ports 36 by means of cross connections 62 as best illustrated in Figs. 4 and 6. These cross connections are formed by means of blocks 63 having L-shaped passages whose horizontal arms communicate with the vertical inspection ports 64 which are located directly above the upper ends of the respective ports 36. Damper blocks 65 are slidingly mounted on the lower ends of the inspection ports 64 in position where they may be conveniently manipulated through said inspection ports, and in position where they may be set back and forth to obstruct the flow of air and gas to the desired extent in order to properly control the operation.

Within each of the regenerator chamber groups 44, 45, 46 and 47 is located a suitable checker structure. These regenerator groups are separated by the intermediate partitions 66, 67, 68 and 69 which partitions constitute a portion of the sub-structure and partially support the super-structure.

The sole passages 48, 49, 50 and 51 as well as the risers 52, 53, 54, 55, 56, 57, 59, and 60 are all located within a sole structure 70 which lies intermediate between the super and sub-structures. This sole structure spans the various regenerator chambers serving to close their upper ends as well as to supply the oven floors.

Beneath the regenerator groups 44, 45, 46 and 47 respectively, are the horizontal channels 71, 72, 73 and 74. These channels are connected up to suitable spent gas off-takes, to suitable air connections, and to suitable gas connections for either producer or other gas in such a manner as to permit operation according to the wishes of the operator. In Fig. 22 I have shown diagrammatically a series of such connections and valves which will permit the operation to be performed in the manner hereinbefore explained. As shown in this diagram, there are provided the spent gas tunnels 75 and 76 at the two sides of the structure. There are also provided the gas main 77 and the air main 78 at one side and the gas main 79 and the air main 80 at the other side. The channel 71 has its lead 81 connected to the spent gas tunnel 75 and to the air and gas leads 78 and 79 respectively under control of the valves 82, 83 and 84; the channel 72 has its lead 85 connected to the spent gas tunnel 76 and to the air and gas leads 80 and 79 respectively under the control of valves 86, 87 and 88 respectively; the channel 73 has its lead 89 connected to the spent gas tunnel 75 and to the air connection 78 under control of the valves 90 and 91 respectively; and the channel 74 has its lead 92 connected to the spent gas tunnel 76 and to the air connection 80 under control of the valves 93 and 94.

With this arrangement when operating on unpreheated gas, the air valves 87 and 94, and the spent gas valves 82 and 90 will be open on the down flow, and the air valves 83 and 91 and the spent gas valves 86 and 93 will be opened on the up flow, all other valves being closed. At such times the unpreheated gas will be admitted through the nozzles 35 on the down flow and to the nozzles 37 on the up flow. With this arrangement also the air valve 91 and the gas valve 84, and the spent gas valves 86 and 83 will be opened on the up flow, and the air valve 94 and gas valve 88, and the spent gas valves 82 and 90 will be opened on the down flow when operating on preheated gas and preheated air.

Manifestly the regenerators and their channels for each oven will be connected up in a similar manner. Furthermore, many other arrangements of valves and connections might be substituted in place of those just above explained in detail.

Reference particularly to Fig. 7 shows that certain of the blocks from which the heating walls are constructed are provided with vertical notches 95, and also shows that the blocks in which these notches are located are vertically aligned with respect to the slitted burner blocks 37 in the bottom portion of the wall. These notches are also aligned with respect to the upper burners 35. It is thus possible to observe the operation of the lower nozzles 37 by looking down through the upper nozzles 35; and it is also possible to insert cleaning rods downwardly through the upper nozzles and the notches for the purpose of cleaning the lower nozzles.

I will call attention to the fact that I have herein illustrated a construction in which each of the ovens, including its heating walls, sole, and regenerator chambers, is divided into a number of sections designated respectively A, B, C, D, E, and F, which sections are joined together by means of expansion joints which are illustrated more in detail in Figs. 7, 12, 13, 14, 15, 16, 17, 18, 19, 20 and 21; each regenerator group also including a series of more or less independent chambers corresponding to these sections. Furthermore, this arrangement is also such that the various sole passages 48, 49, 50 and 51 are also sectionalized as shown more particularly in Figs. 2, 18, 19, 20 and 21. This sectionalizing is so arranged that the lengthwise expansion and contraction of the ovens may be concentrated at the expansion joints which are especially designed and intended to properly take care of such expansion and contraction, the oven sections themselves remaining at all times tight and not being called upon to take up any of this expansion and contraction. For this purpose, the various joints between the sections are so formed, and the oven sections are so related to each other that repeated expansions and contractions may take place as occasioned for example by repeated heatings and coolings, without opening up any seams in the sections themselves. Inasmuch as these features constitute especially the subject matter of another application for Letters Patent of the United States I do not claim the same herein but I have shown them in the present structure only by way of illustration of a particular structure embodying those features which constitute the subject matter of the present invention and which are therefore particularly claimed in this case.

I claim:—

1. In a coke oven the structure which comprises a pair of separated heating walls defining a retort, a sole structure on which they are mounted, and a foundation structure for the sole structure, each heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators in the foundation beneath the retort, there being four longitudinally extending sole passages in the sole structure corresponding to the regenerators, there being connections from each regenerator to its individual sole passage, there being connections from one sole passage to one port adjacent to each top nozzle, connections from another sole passage to the other port adjacent to each top nozzle, connections from another sole passage to one port adjacent to each bottom nozzle, connections from another sole passage to the other port adjacent to each bottom nozzle, connections for delivering gas for combustion to all of the top nozzles, connections for delivering gas for combustion to all of the bottom nozzles, connections for delivering air into the regenerators for all of the top ports or for all of the bottom ports, or for delivering gas for combustion into the regenerator for one set of top ports and air into the regenerator for the other set of top ports, or for delivering gas for combustion into the regenerator for one set of bottom ports and air into the regenerator for the other set of bottom ports, substantially as described.

2. In a coke oven the structure which comprises a pair of separated heating walls defining a retort, a sole structure on which they are mounted, and a foundation structure for the sole structure, each heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators in the foundation beneath the retort, there being four longitudinally extending sole passages in the sole structure corresponding to the regenerators, there being connections from each regenerator to its individual sole passage, there being connections from one sole passage to one port adjacent to each top nozzle, connections from another sole passage to the other port adjacent to each top nozzle, connections from another sole passage to one port adjacent to each bottom nozzle, and connections from another sole passage to the other port adjacent to each bottom nozzle, connections for delivering gas for combustion to all of the top nozzles, connections for delivering gas for combustion to all of the bottom nozzles, connections for delivering air into the regenerators for all of the top ports and connections for delivering air into the regenerators for all of the bottom ports, substantially as described.

3. In a coke oven the structure which comprises a pair of separated heating walls defining a retort, a sole structure on which they are mounted, and a foundation structure for the sole structure, each heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, for regenerators in the foundation beneath the retort, there being four longitudinally extending sole passages in the sole structure corresponding to the regenerators, there being connections from each regenerator to its individual sole passage, there being connections from one sole passage to one port adjacent to each top nozzle, connections from another sole passage to the other port adjacent to each top nozzle, connections from another sole passage to one port adjacent to each bottom nozzle, connections from another sole passage to the other port adjacent to each bottom nozzle, connections for delivering gas for combustion into the regenerator for one set of top ports and air into the regenerator for the other set of top ports or for delivering gas for combustion into the regenerator for one set of bottom ports, and air into the regenerator for the other set of bottom ports, substantially as described.

4. In a coke oven the structure which comprises a pair of separated heating walls defining a retort, each heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators for the oven, there being four longitudinally extending channels corresponding to the regenerators, there being connections from each regenerator to its individual channel, there being connections from one channel to one port adjacent to each top nozzle, connections from another channel to the other port adjacent to each top nozzle, connections from another channel to one port adjacent to each bottom nozzle, and connections from another channel to the other port adjacent to each bottom nozzle, connections for delivering gas for combustion to all of the top nozzles, connections for delivering gas for combustion to all of the bottom nozzles, connections for delivering air into the regenerators for all of the top ports, connections for delivering air into the regenerators for all of the bottom ports, connections for delivering gas for combustion into the regenerator for one set of top ports and air into the regenerator for the other set of top ports, or for delivering gas for combustion into the regenerator for one set of bottom ports and air into the regenerator for the other set of bottom ports, substantially as described.

5. In a coke oven the structure which comprises a pair of separated heating walls defining a retort, each heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators for the retort, there being four longitudinally extending channels corresponding to the regenerators, there being connections from each regenerator to its individual channel, there being connections from one channel to one port adjacent to each top nozzle, connections from another channel to the other port adjacent to each top nozzle, connections from another channel to one port adjacent to each bottom nozzle, and connections from another channel to the other port adjacent to each bottom nozzle, and connections for delivering gas for combustion selectively to all of the top nozzles or to all of the bottom nozzles and for simultaneously delivering air into the regenerators for all of the top ports or for all of the bottom ports, substantially as described.

6. In a coke oven the structure which comprises a pair of separated heating walls defining a retort, each heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators for the retort, there being four longitudinally extending channels corresponding to the regenerators, there being connections from each regenerator to its individual channel, there being connections from one channel to one port adjacent to each top nozzle, connections from another channel to the other port adjacent to each top nozzle, connections from another channel to one port adjacent to each bottom nozzle, and connections from another channel to the other port adjacent to each bottom nozzle, and connections for delivering gas for combustion into the regenerator for one set of top ports and air into the regenerator for the other set of top ports, or for delivering gas for combustion into the regenerator for one set of bottom ports and air into the regenerator for the other set of bottom ports, substantially as described.

7. In a coke oven the structure which includes a heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators, there being connections from one regenerator to one port adjacent to each top nozzle, connections from another regenerator to the other port adjacent to each top nozzle, connections from another regenerator to one port adjacent to each bottom nozzle, and connections from the other regenerator to the other port adjacent to each bottom nozzle, connections for delivering gas for combustion to all of the top nozzles, connections for delivering gas for combustion to all of the bottom nozzles, connections for simultaneously delivering air into the regenerators for all of the top ports or for all of the bottom ports or for delivering gas for combustion into the regenerator for one set of top ports and air into the regenerator for the other set of top ports, or for delivering gas for combustion into the regenerator for one set of bottom ports, and air into the regenerator for the other set of bottom ports, substantially as described.

8. In a coke oven the structure which includes a heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators, there being connections from one regenerator to one port adjacent to each top nozzle, connections from another regenerator to the other port adjacent to each top nozzle, connections from another regenerator to one port adjacent to each bottom nozzle, and connections from the other regenerator to the other port adjacent to each bottom nozzle, connections for delivering gas for combustion to all of the top nozzles, connections for delivering gas for combustion to all of the bottom nozzles and connections for simultaneously delivering air into the regenerators for all of the top ports or for all of the bottom ports, substantially as described.

9. In a coke oven the structure which includes a heating wall having on its interior passages for the transfer of heating gases in a vertical direction, top gas nozzles along the top portion of the wall, bottom gas nozzles along the bottom portion of the wall, there being a pair of ports adjacent to each top gas nozzle, and there being a pair of ports adjacent to each bottom gas nozzle, four regenerators, there being connections from one regenerator to one port adjacent to each top nozzle, connections from another regenerator to the other port adjacent to each top nozzle, connections from another regenerator to one port adjacent to each bottom nozzle, and connections from the other regenerator to the other port adjacent to each bottom nozzle, and connections for delivering gas for combustion into the regenerator for one set of top ports and air into the regenerator for the other set of top ports, or for delivering gas for combustion into the regenerator for one set of bottom ports and air into the regenerator for the other set of bottom ports, substantially as described.

10. In a coke oven the structure which includes a heating wall having on its interior passages for the transfer of heating gases in a vertical direction, there being pairs of ports in the upper portion of the wall, and there being pairs of ports in the lower portion of the wall, four regenerators, there being connections from one regenerator to one port of each top pair, connections from another regenerator to the other port of each top pair, connections from another regenerator to one port of each bottom pair, and connections from the other regenerator to the other port of each bottom pair, and connections for delivering gas for combustion into the regenerator for one set of top ports and air into the regenerator for the other set of top ports, or for delivering gas for combustion into the regenerator for one set of bottom ports, and air into the regenerator for the other set of bottom ports, substantially as described.

11. In a coke oven the structure having on its interior passages for the transfer of heating gases in a vertical direction, there being pairs of ports in the upper portion of the wall, and there being pairs of ports in the lower portion of the wall, and four regenerators, there being connections from one regenerator to one port of each top pair, connections from another regenerator to the other port of each top pair, connections from another regenerator to one port of each bottom pair, and connections from the other regenerator to the other port of each bottom pair, substantially as described.

12. In a coke oven the structure which includes a heating wall having on its interior a series of interconnected horizontally and vertically extending passages for the transfer of heating gases in a vertical direction, there being pairs of ports in the upper portion of the wall, there being pairs of ports in the lower portion of the wall, four regenerators, there being connections from one regenerator to one port of each top pair, connections from another regenerator to the other port of each top pair, connections from another regenerator to one port of each bottom pair, and connections from the other regenerator to the other port of each bottom pair, and connections for delivering gas for combustion into the regenerator for one set of top ports and air into the regenerator for the other set of top ports, or for delivering gas for combustion into the regenerator for one set of bottom ports, and air into the regenerator for the other set of bottom ports, substantially as described.

13. In a coke oven the structure which includes a heating wall having on its interior a series of horizontally and vertically extending intercommunicating passages for the transfer of heating gases in a vertical direction, there being pairs of ports in the upper portion of the wall, and there being pairs of ports in the lower portion of the wall, and four regenerators, there being connections from one regenerator to one port of each top pair, connections from another regenerator to the other port of each top pair, connections from another regenerator to one port of each bottom pair, and connections from the other regenerator to the other port of each bottom pair, substantially as described.

14. In a coke oven the structure which includes a heating wall having on its interior central portion a series of horizontally and vertically extending inter-communicating passages for the transfer of heating gases in zig-zag fashion in a generally vertical direction, there being a series of combustion chambers in communication with the top and bottom edges of said inter-communicating passages, a gas nozzle in communication with each combustion chamber, there being two ports in communication with each combustion chamber, connections for delivering gas for combustion to the upper nozzles, connections for delivering gas for combustion into the lower nozzles, connections for delivering air to the upper and lower ports selectively, or for delivering air and gas for combustion through the two ports leading into each top combustion chamber or air and gas for combustion through the two ports leading into each bottom combustion chamber selectively, substantially as described.

15. In a coke oven the structure which includes a heating wall having in its central portion a series of horizontally and vertically extending inter-communicating passages for the transfer of heating gases in zig-zag fashion in a generally vertical direction, there being a series of combustion chambers in communication with the top and bottom edges of said inter-communicating passages, there being two ports in communication with each combustion chamber, and connections for delivering air and gas for combustion through the two ports leading into each top combustion chamber or air and gas for combustion through the two ports leading into each bottom combustion chamber selectively, substantially as described.

16. In a coke oven the structure which includes a heating wall having on its interior central portion a series of vertically and horizontally extending inter-communicating passages for the transfer of heating gases in zig-zag fashion between two opposite edges of said wall, there being a series of combustion chambers in communication with said passages adjacent to one edge and another series of combustion chambers in communication with said passages adjacent to the other edge, there being two ports and a gas nozzle in communication with each combustion chamber, and connections for delivering gas for combustion to either set of nozzles and air through the ports leading into the combustion chambers for said nozzles selectively, or for delivering air and gas for combustion through the ports leading into either set of combustion chambers selectively, substantially as described.

17. In a coke oven the structure which includes a heating wall having on its interior central portion a series of vertically and horizontally extending inter-communicating passages for the transfer of heating gases in zig-zag fashion between two opposite edges of said wall, there being a series of combustion chambers in communication with said passages adjacent to one edge and another series of combustion chambers in communication with said passages adjacent to the other edge, there being two ports in communication with each combustion chamber, and connections for delivering air and gas for combustion through the ports leading into either set of combustion chambers selectively, substantially as described.

18. In a coke oven the structure which comprises in combination a sole section having four longitudinally extending non-communicating channels, a pair of heating walls on said sole section, each heating wall having on its interior a series of vertically extending passages for the transfer of heating gases in a vertical direction, and having on its interior pairs of top ports and pairs of bottom ports, there being passages leading from the top channel to one port of each bottom pair, passages leading from the upper intermediate channel to one port of each top pair, passages leading from the lower intermediate channel to the other port of each bottom pair, and passages from the bottom channel to the other port of each top pair, and separate regenerators in communication with the various channels, substantially as described.

19. In a coke oven the structure which comprises in combination a sole section having four longitudinally extending non-communicating channels, a pair of heating walls on said sole section, each heating wall having on its interior a series of vertically extending passages for the transfer of heating gases in a vertical direction, and having on its interior pairs of top ports and pairs of bottom ports, there being passages leading from the top channel to one port of each bottom pair, passages leading from the upper intermediate channel to one port of each top pair, passages leading from the lower intermediate channel to the other port of each bottom pair, and passages from the bottom channel to the other port of each top pair, substantially as described.

20. In a coke oven the structure which comprises in combination a pair of heating walls each having on its interior a series of passages for the transfer of heating gases in a vertical direction, there being four channels for said heating walls, there being pairs of top and bottom ports communicating with the passages in each heating wall, there being passages from one channel to one port of each bottom pair, passages from another channel to the other port of each bottom pair, passages from another channel to one port of each top pair, and passages from another channel to the other port of each top pair, and separate regenerators in communication with the respective channels, substantially as described.

21. In a coke oven the structure which comprise in combination a pair of heating walls each having on its interior a series of passages for the transfer of heating gases in a vertical direction, there being four channels for said heating walls, there being pairs of top ports and pairs of bottom ports communicating with the passages in each heating wall, there being passages from one channel to one port of each bottom pair, passages from another channel to the other port of each bottom pair, passages from another channel to one port of each top pair, and passages from another channel to the other port of each top pair, substantially as described.

22. A bench of coke ovens including a series of separated heating walls providing coking chambers between them, there being passages within each heating wall for the transfer of heating gases therethrough in a vertical direction, there being one series of combustion chambers along the upper portion of each heating wall and another series of combustion chambers along the lower portion of each heating wall, there being two ports and a gas nozzle in communication with each combustion chamber, and regenerators in groups of four, there being connections between one port of each upper combustion chamber and a corresponding regenerator, connections between the other port of each upper combustion chamber, and another corresponding regenerator, connections between one port of each lower combustion chamber and another corresponding regenerator, and connections between the other port of each lower combustion chamber and another corresponding regenerator, and connections for delivering gas for combustion to the nozzles leading into the upper combustion chambers and air to the regenerators for the ports for said chambers or for delivering gas for combustion to the nozzles for the lower combustion chambers and air to the regenerators for the ports of said chambers or for delivering gas for combustion and air to the regenerators for the ports of the upper combustion chambers or gas for combustion and air to the regenerators for the ports for the lower combustion chambers selectively, substantially as described.

23. A bench of coke ovens including a series of separated heating walls providing coking chambers between them, there being passages within each heating wall for the transfer of heating gases therethrough in a vertical direction, there being one series of combustion chambers along the upper portion of each heating wall and another series of combustion chambers along the lower portion of each heating wall, there being two ports and a gas nozzle in communication with each combustion chamber, and regenerators in groups of four, there being connections between one port of each upper combustion chamber and a corresponding regenerator, connections between the other port of each upper combustion chamber and another corresponding regenerator, connections between one port of each lower combustion chamber and another corresponding regenerator, and connections between the other port of each lower combustion chamber and another corresponding regenerator, and connections for delivering gas for combustion to the nozzles leading into the upper combustion chambers and air to the regenerators for the ports for said chambers or for delivering gas for combustion to the nozzles for the lower combustion chambers and air to the regenerators for the ports of said chambers, substantially as described.

24. A bench of coke ovens including a series of separated heating walls providing coking chambers between them, there being passages within each heating wall for the transfer of heating gases therethrough in a vertical direction, there being one series of combustion chambers along the upper portion of each heating wall and another series of combustion chambers along the lower portion of each heating wall, there being two ports and a gas nozzle in communication with each combustion chamber, and regenerators in groups of four, there being connections between one port of each upper combustion chamber and a corresponding regenerator, connections between the other port of each upper combustion chamber and another corresponding regenerator, connections between one port of each lower combustion chamber and another corresponding regenerator, and connections between the other port of each lower combustion chamber and another corresponding regenerator, and connections for delivering gas for combustion and air to the regenerators for the ports of the upper combustion chambers or gas for combustion and air to the regenerators for the ports for the lower combustion chambers selectively, substantially as described.

ARTHUR ROBERTS.